(12) United States Patent
Yoon et al.

(10) Patent No.: US 8,155,104 B2
(45) Date of Patent: Apr. 10, 2012

(54) METHOD FOR PREAMBLE-BASED BANDWIDTH REQUEST IN WIRELESS PORTABLE INTERNET SYSTEM

(75) Inventors: Chul-Sik Yoon, Daejeon (KR); Chang-Wahn Yu, Daejeon (KR); Kun-Min Yeo, Daejeon (KR); Byung-Han Ryu, Daejeon (KR)

(73) Assignees: Electronics and Telecommunications Research Institute (KR); Samsung Electronics Co., Ltd. (KR); KT Corporation (KR); KTFreetel Co., Ltd. (KR); Hanaro Telecom., Inc. (KR); SK Telecom Co., Ltd. (KR)

( * ) Notice: Subject to any disclaimer, the term of this patent is extended or adjusted under 35 U.S.C. 154(b) by 1122 days.

(21) Appl. No.: 10/578,114

(22) PCT Filed: Oct. 27, 2004

(86) PCT No.: PCT/KR2004/002731
§ 371 (c)(1),
(2), (4) Date: May 10, 2007

(87) PCT Pub. No.: WO2005/040960
PCT Pub. Date: May 6, 2005

(65) Prior Publication Data
US 2007/0274265 A1  Nov. 29, 2007

(30) Foreign Application Priority Data

Oct. 29, 2003 (KR) .................. 10-2003-0075835
May 18, 2004 (KR) .................. 10-2004-0035207

(51) Int. Cl.
*H04J 3/24* (2006.01)
(52) U.S. Cl. ........................... 370/349; 455/450
(58) Field of Classification Search .............. 370/349; 455/450
See application file for complete search history.

(56) References Cited

U.S. PATENT DOCUMENTS

2002/0077097 A1 * 6/2002 Mizell et al. .................. 455/423
2003/0198179 A1 10/2003 Koo et al.

OTHER PUBLICATIONS

Carl Eklund et al., IEEE Standard 802.16: A Technical Overview of the WirelessMAN Air Interface for Broadband Wireless Access, IEEE Communications Magazine, Jun. 2002.

* cited by examiner

*Primary Examiner* — Marcos Batista
(74) *Attorney, Agent, or Firm* — The Farrell Law Firm, P.C.

(57) ABSTRACT

Disclosed is a method for a preamble-based bandwidth request. The present invention enables state control of a subscriber station based on the latest environment in a portable Internet system requesting a bandwidth using a preamble, and hence allows a subsequent more efficient transmission of user data. In addition, the present invention provides information for discrimination of the subscriber station transmitting the preamble as well as state control information of the subscriber station to the base station during a preamble-based bandwidth request by the subscriber station, and enables the base station to discriminate the subscriber station in the next time of data transmission with the subscriber station.

12 Claims, 8 Drawing Sheets

METHOD FOR PREAMBLE-BASED BANDWIDTH REQUEST IN WIRELESS PORTABLE INTERNET SYSTEM

TECHNICAL FIELD

The present invention relates to a method for a bandwidth request in a wireless Internet system. More specifically, the present invention relates to a method for a preamble-based bandwidth request in a wireless portable Internet system suggested by the IEEE 802.16 standardization group.

BACKGROUND ART

The wireless portable Internet is a next-generation communication system that supports mobility in LAN (Local Area Network) data communication systems using a fixed access point such as the existing wireless LAN system. A variety of standards for the wireless portable Internet have been developed, and international standardization of portable Internet is now in progress actively on the IEEE 802.16 standardization group.

Figure 1:
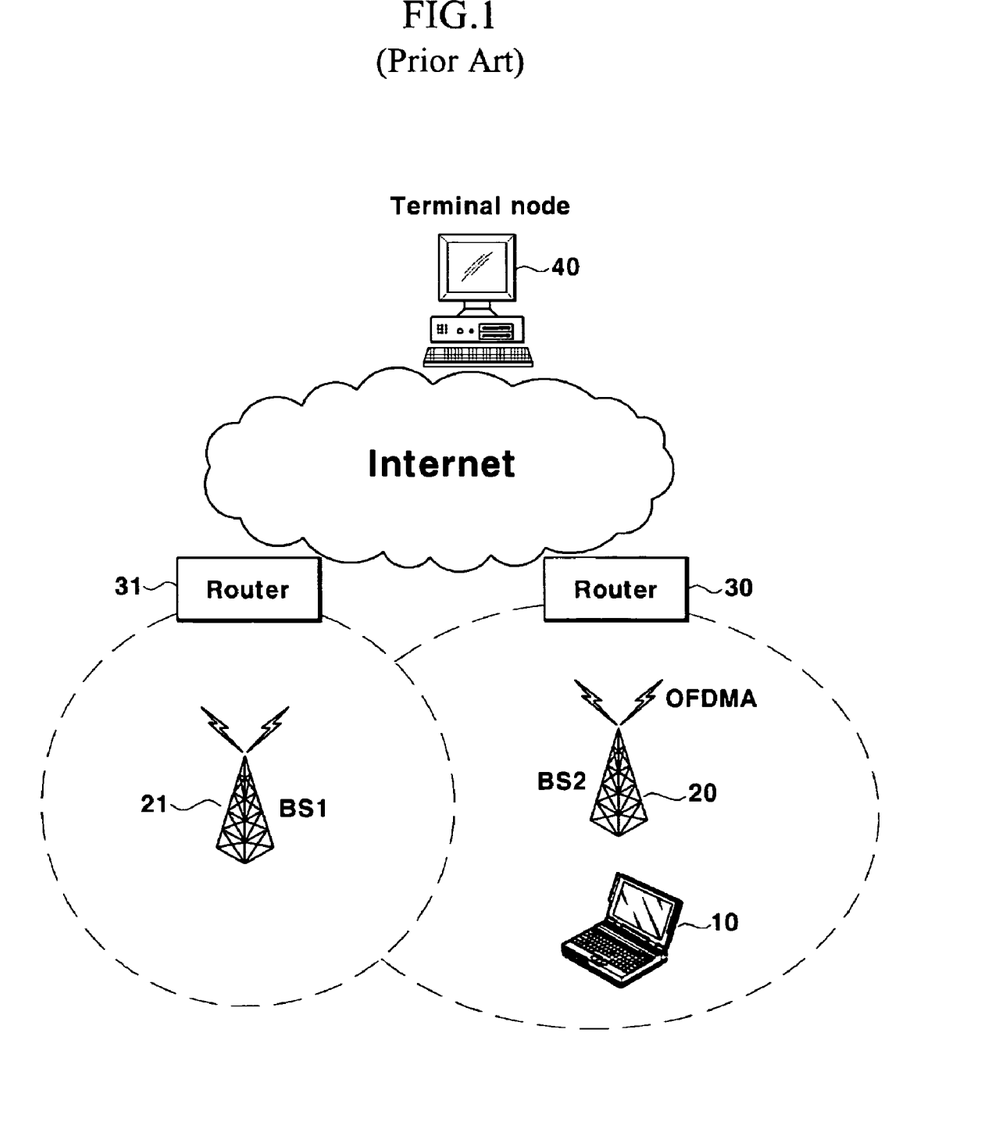
FIG. 1 is a schematic of a wireless portable Internet system.

FIG. 1 is a schematic of a wireless portable Internet system under development in the IEEE 802.16 standardization group.

The wireless portable Internet system basically includes a subscriber station (SS) 10, base stations 20 and 21 performing wireless communication with the subscriber station 10, routers 30 and 31 being connected to the base stations through a gateway, and an Internet network.

The wireless portable Internet system of FIG. 1 secures the mobility of the subscriber station 10 even when the subscriber station 10 is moving from a cell managed by the base station 20 to a cell imaged by the base station 21, thereby providing a seamless data communication service. Therefore, the wireless portable Internet system supports a handover of the subscriber station 10 as in the mobile communication service, and performs dynamic IP address allocation according to the movement of the subscriber station 10.

Figure 2:
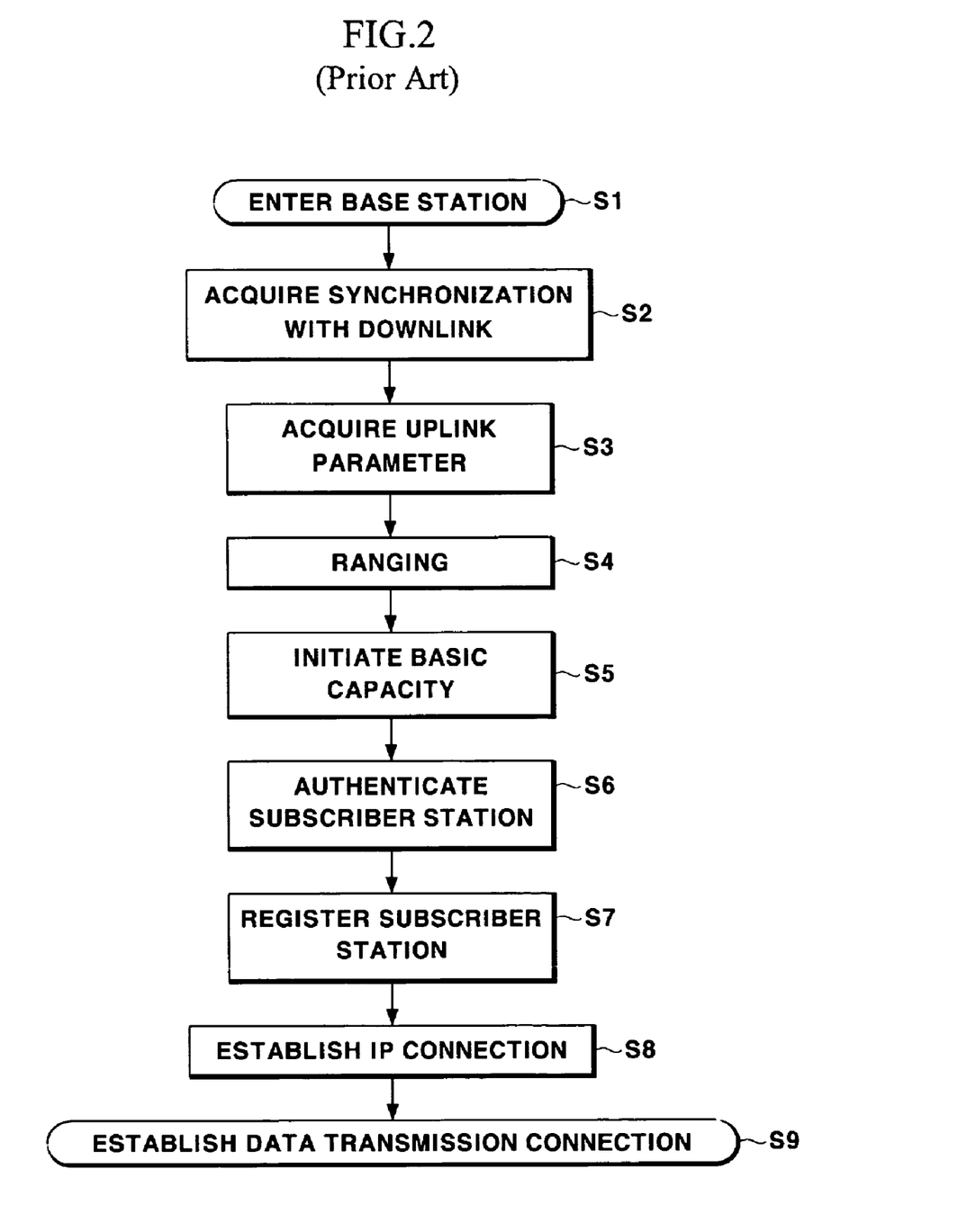
FIG. 2 shows a connection establishment process of a wireless portable Internet system.

FIG. 2 is a flow chart showing a connection establishment process in the wireless portable Internet system.

As the subscriber station 10 enters the cell of the base station 20, in step S1, the base station 20 acquires downlink synchronization with the subscriber station 10, in step S2. With the downlink synchronization a the subscriber station 10 acquires an uplink parameter, in step S3.

Subsequently, ranging between the subscriber station 10 and the base station 20 is achieved, in step S4. The ranging procedure, which is the adjustment of timing, power, and frequency offset between the subscriber station and the base station, includes an initial ranging step and a subsequent periodic ranging step.

After the completion of the ranging procedure, negotiation of the basic (service) capabilities for connection establishment between the subscriber station 10 and the base station 20 is performed, in step S5. Once the negotiation of the basic capabilities is completed, the base station 20 authenticates the subscriber station 10 using an equipment identifier such as the subscriber station's MAC (Medium Access Control) address, and a certificate such as X.509 Digital Certificate issued by the manufacturers in step S6.

When the subscriber station 10 is authenticated and authorized to use the wireless portable Internet service, the equipment address and capabilities for services of the subscriber station 10 is registered, in step S7. Then, the basic station 20 provides an IP address received from an IP address management system such as a DHCP (Dynamic Host Configuration Protocol) server to the subscriber station 10 to establish the IP connection, in step S8. Upon receiving the IP address, the subscriber station 10 performs connection establishment for data transfer, in step S9.

The bandwidth request method of the subscriber station from the base station is divided into a non-contention-based bandwidth request method, and a contention-based bandwidth request method.

The non-contention-based request method includes a unicast polling method similar to the existing messaging-based bandwidth request method, and a piggyback method.

Namely, the unicast polling method or the piggyback method can be used efficiently when a bandwidth available to the corresponding subscriber station can be allocated to the uplink. Otherwise, a contention-based bandwidth request method is required instead of those methods.

Hence, the portable Internet system under development in the IEEE 802.16 standardization group employs a CDMA-based bandwidth request method as a contention-based bandwidth request method.

In the portable Internet system suggested by the IEEE 802.16 standardization group, a CDMA-based periodic ranging request and a CDMA-based bandwidth request are transmitted on the same uplink domain. The bandwidth request is for the subscriber station to request uplink bandwidth allocation from the base station, and the periodic ranging request is to periodically adjust the system based on the channel state. Here, two ranging codes or preambles (hereinafter, codes and preambles are used in the same meaning) used for the bandwidth request and the periodic ranging request are identified by the base station using a dynamically allocated CUG (Code Usage Group) in UCD (Uplink Channel Descriptor) message transmitted to the subscriber station.

Figure 3:
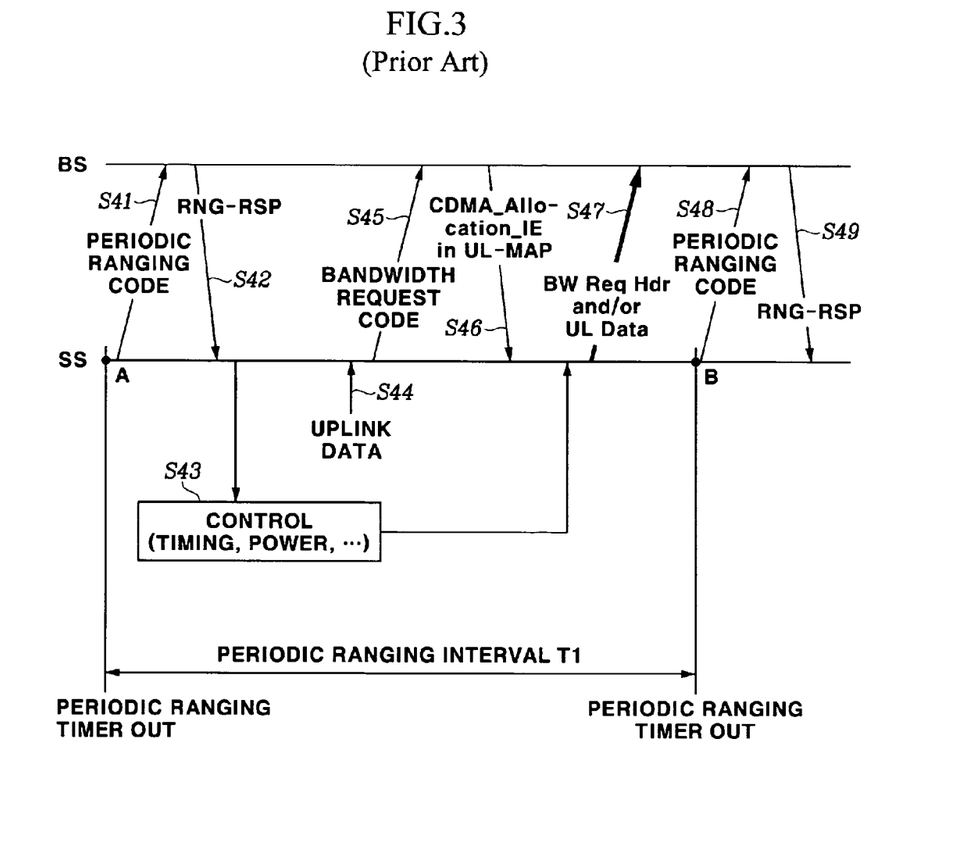
FIG. 3 shows a preamble-based bandwidth request method according to prior art.

FIG. 3 shows a bandwidth request method of the portable Internet system according to prior art.

Referring to FIG. 3, after a ranging timer times out, a mobile station SS transmits a periodic ranging code to a base station BS, in step S41. The base station BS transmits a ranging response message RNG-RSP specifying state control information to the subscriber station SS, in step S42. Upon receiving the ranging response message for the periodic ranging from the base station BS, the subscriber station SS adjusts timing, power, frequency offsets based on the state control information received from the base station, in step S43. The periodic ranging procedure is iterated in units of a predetermined interval T1 (hereinafter, referred to as "periodic ranging interval").

When the subscriber station SS intends to transmit uplink data, in step S44, it transmits a bandwidth request code BW Req Code to the base station BS, in step S45. Upon receiving the bandwidth request code, the base station BS allocates a resource for transmission of a bandwidth request message to the subscriber station SS, in step S46. The base station BS also allocates information (e.g., frame number, slot number, sub-channel number, code number, etc.) for discrimination of the subscriber station transmitting the code using CDMA_Allocation_IE of the uplink map UL-MAP, because it cannot discriminate the subscriber station transmitting the bandwidth request code (or preamble) from the identifier of the subscriber station SS. Upon receiving the information, the subscriber station SS transmits a desired bandwidth value, i.e., a bandwidth request header BW Req Header and/or uplink data (UL Data) in step S47

According to the conventional method of FIG. 3, the control of timing, power, and frequency based on the channel state is achieved only by periodic ranging, without a separate control operation during a bandwidth request. As a result, data are transmitted without control information based on the channel state using a bandwidth allocated after transmission of a bandwidth request code. In the fixed wireless environment in which the channel state does not vary so frequently, it has only to control the subscriber station based on the channel state using periodic ranging repeated in units of a predetermined interval T1, as shown in FIG. 3. In the mobile environment that has the channel state changing very frequently relative to the wireless environment, however, a proper adaptive modulation and coding (AMC) level based on the channel state cannot be applied in using the method of FIG. 3, and accordingly, efficient transmission becomes more difficult. In addition, interference occurs to the data of subscribers using adjacent sub-channels when the timing as a state control information is not matched.

DISCLOSURE OF INVENTION

Technical Problem

It is an advantage of the present invention to provide a method for a preamble-based bandwidth request for rapid adaptation to a channel environment.

Technical Solution

In one aspect of the present invention, there is provided a method for a preamble-based bandwidth request that includes: (a) receiving a bandwidth request code from a subscriber station; (b) transmitting state control (timing and power adjustment) information based on a channel state to the subscriber station; and (c) allocating an uplink resource for transmission of a bandwidth request message to the subscriber station.

In another aspect of the present invention, there is provided a method for a preamble-based bandwidth request that includes: (a) receiving a periodic ranging code from a subscriber station; (b) transmitting state control information based on a channel state to the subscriber station using a ranging response message; (c) receiving a bandwidth request code from the subscriber station; (d) transmitting channel state information based on the channel state and information for discrimination of the subscriber station to the subscriber station using the ranging response message; and (e) allocating an uplink resource for transmission of a bandwidth request message to the subscriber station.

In further another aspect of the present invention, there is provided a method for a preamble-based bandwidth request that includes: (a) receiving a periodic ranging code from a subscriber station; (b) transmitting state control information based on a channel state to the subscriber station using a ranging response message; (c) receiving a bandwidth request code from the subscriber station; (d) transmitting state control information based on the channel state and a temporary connection identifier allocated to the subscriber station transmitting the bandwidth request code using the ranging response message; and (e) allocating an uplink resource for transmission of a bandwidth request message to the subscriber station using the temporary connection identifier.

In still another aspect of the present invention, there is provided a method for a preamble-based bandwidth request that includes: (a) transmitting a bandwidth request code to a base station; (b) receiving channel state control information from the base station in response to the bandwidth request code, and controlling the state of a subscriber station based on the channel state control information; (c) receiving an uplink resource allocated for transmission of a bandwidth request message from the base station; and (d) performing modulation and channel coding based on channel state information received from the base station, and transmitting uplink data using the bandwidth request message.

BRIEF DESCRIPTION OF THE DRAWINGS

The accompanying drawings, which are incorporated in and constitute a part of the specification, illustrate an embodiment of the invention, and, together with the description, serve to explain the principles of the invention.

BEST MODE FOR CARRYING OUT THE INVENTION

The present invention enables state control (e.g., power, frequency, or timing correction) of a subscriber station based on the latest environment in a wireless Internet system (or a mobile communication system) as a response to a bandwidth request using a preamble, and hence allows a subsequent more efficient transmission of user data.

In addition, the present invention provides a temporary CID (Connection Identifier) as an identifier for discrimination of a subscriber station transmitting a specific preamble as well as state control information to discriminate the subscriber station in data transmission, because the subscriber station transmitting the preamble cannot be discriminated during a preamble-based bandwidth request.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

Hereinafter, a bandwidth request method applicable to an IEEE 802.16e portable Internet system will be described by way of an example, which is not intended to limit the present invention.

Figure 4:
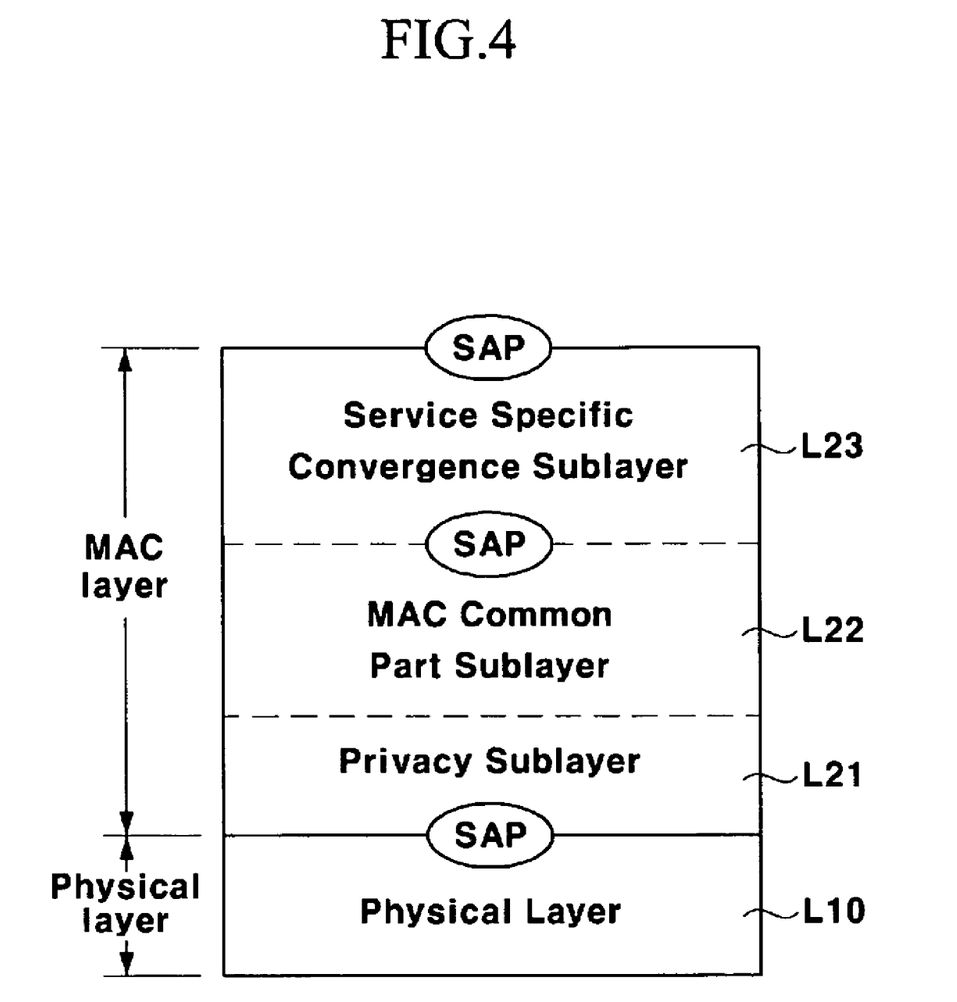
FIG. 4 shows a hierarchical structure of a wireless portable Internet system according to the IEEE 802.16e.

FIG. 4 shows a hierarchical structure of a wireless portable Internet system according to the IEEE 802.16e.

The hierarchical structure of the IEEE 802.16e wireless portable Internet system includes, as shown in FIG. 4, a physical layer L10, and MAC (Media Access Control) layers L21, L22, and L23.

The physical layer L10 has a wireless communication function such as modulation/demodulation, coding, etc. as performed by a normal physical layer.

According to the IEEE 802.16e, the wireless portable Internet system does not have function-specific MAC layers as a wired Internet system, but a single MAC layer in charge of different functions. In the embodiment of the present invention, the MAC layer includes privacy sublayer L21, MAC common part sublayer L22, and service specific convergence sublayer L23.

The service specific convergence sublayer L23 has payload header suppression and QoS mapping functions in consecutive data communication. The MAC common part sublayer L22 is the core of the MAC layer that is in charge of system access, bandwidth allocation, connection establishment and maintenance, and QoS control. The privacy sublayer L21 has functions of equipment authentication and security key exchange, and encryption.

Figure 5:
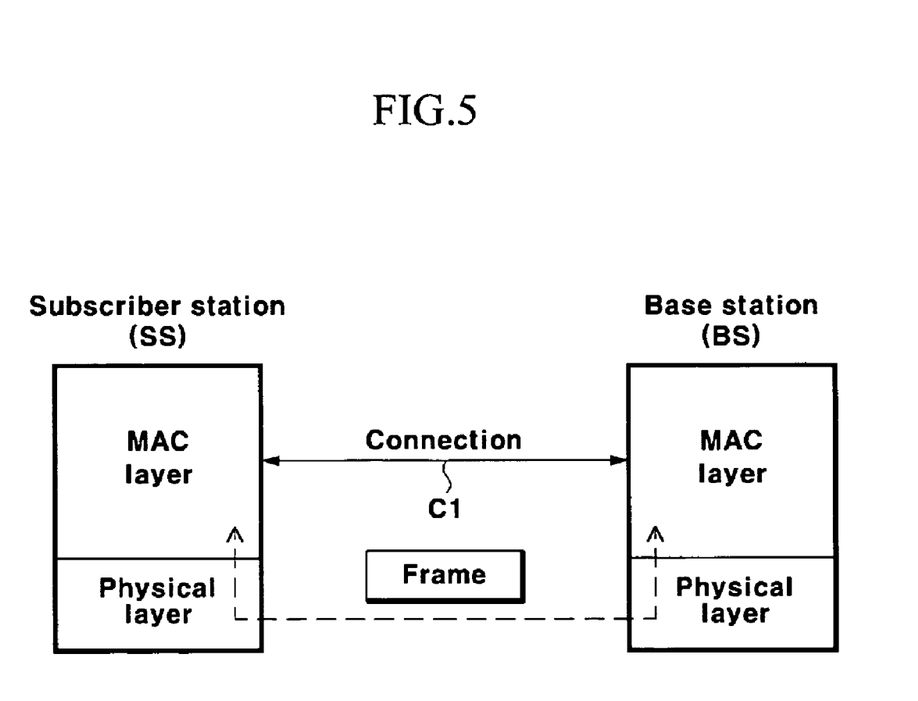
FIG. 5 is a schematic of a connection structure between a base station and a subscriber station in a wireless portable Internet system according to an embodiment of the present invention.

FIG. 5 is a schematic of a connection structure between a base station and a subscriber station in the wireless portable Internet system according to an embodiment of the present invention.

A connection is provided between the MAC layers of the subscriber station SS and the base station BS. The term "connection C1" as used herein does not refer to a physical connection but a logical connection that is defined as a mapping relationship between the MAC peers of the subscriber station SS and the base station BS for traffic transmission of one service flow.

Hence, the parameter/message as defined on the connection C1 refers to a function executed between the MAC peers. Actually, the parameter/message is processed into a frame, which is transferred through the physical layer and analyzed so as to enable the MAC layer to execute the function corresponding to the parameter/message.

The MAC message transmitted through the connection C1 includes a connection identifier (CID) used as an address of the MAC layer to identify the connection; a MAP defining the burst symbol offsets and sub-channel offsets time-divided by the subscriber station on the downlink/uplink, the number of symbols of the resource allocated, and the number of sub-channels; and channel descriptors (including a DCD (Downlink Channel Descriptor) and a UCD (Uplink Channel Descriptor)) specifying the characteristic of the physical layer according to the characteristic of the downlink/uplink. The MAC message also includes various messages for request (REQ), response (RSP), and acknowledgement (ACK) functions for various operations.

Figure 6:
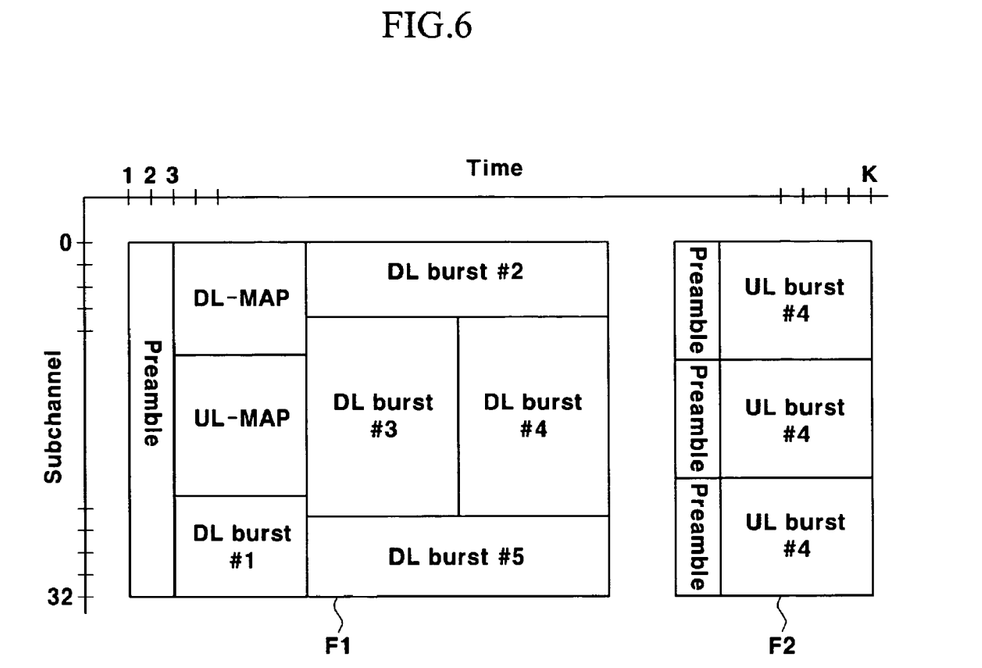
FIG. 6 shows a frame structure of a wireless portable Internet system according to an embodiment of the present invention.

FIG. 6 is a frame diagram showing the frame structure of the wireless portable Internet system.

Referring to FIG. 6, the frame is divided into a downlink sub-frame F1 and an uplink sub-frame F2 according to a transmission direction. In the frame diagram, the ordinate axis represents sub-channels comprising orthogonal frequencies while the abscissa axis represents the time-divided symbol axis.

The downlink sub-frame F1 includes a preamble, a downlink MAP, an uplink MAP, and a plurality of downlink bursts. The downlink bursts are not user-specific channels or resources but transfer-level-specific channels or resources classified by transfer level having the same modulation or channel coding method. The downlink MAP has offset information, modulation information, and coding information corresponding to a plurality of users of a sane modulation and channel coding method to allocate resources to the users. Hence, the MAP has the characteristic of broadcast channels and requires high robustness.

The uplink sub-frame F2 has a function of user-specific transmission, and the uplink burst includes user-specific information.

Figure 7:
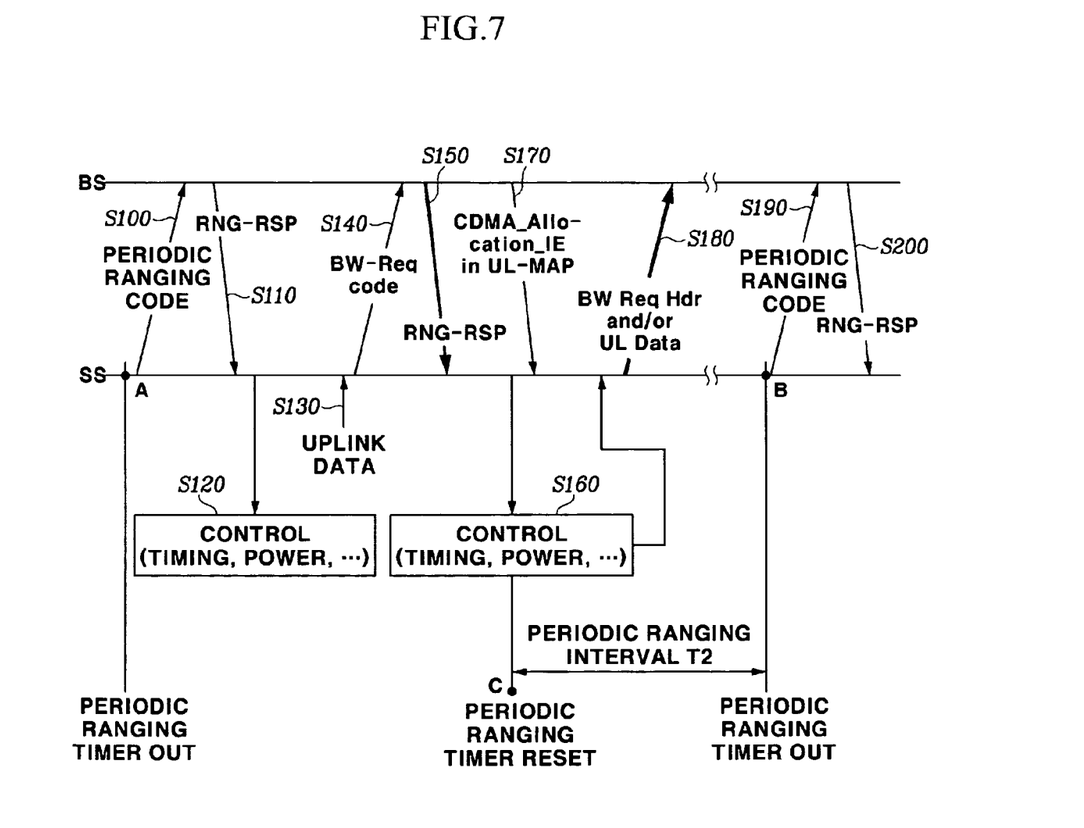
FIG. 7 shows a preamble-based bandwidth request method according to a first embodiment of the present invention.

FIG. 7 shows a preamble-based bandwidth request method according to a first embodiment of the present invention.

Referring to FIG. 7, after a ranging timer expires, a mobile station SS transmits a periodic ranging code to a base station BS, in step S100. The base station BS transmits a ranging response message RNG-RSP for periodic ranging to the subscriber station SS, in step S110. Upon receiving the ranging response message for periodic ranging from the base station BS, the subscriber station SS adjusts timing, power, frequency offset based on the response message, in step S120.

When the subscriber station SS intends to transmit uplink data, in step S130, it transmits a bandwidth request code BW Req Code to the base station BS, in step S140. Upon receiving the bandwidth request code, the base station BS transmits a ranging response message specifying state control information to the subscriber station SS as in the case of a periodic ranging code request, in step S150. Then the subscriber station SS adjusts timing, power, frequency offset based on the ranging response message, in step S160. At this time, the base station BS cannot discriminate the subscriber station transmitting the bandwidth request code (or preamble) from the identifier of the subscriber station SS, so it transmits information (e.g., frame number, slot number, sub-channel number, code number, etc.) for discrimination of the code-transmitting subscriber station in the ranging response message.

After the lapse of a predetermined time period from the time of transmission of the ranging response message, the base station BS allocates a resource available for transmission of a bandwidth request message to the corresponding subscriber station SS, in step S170. The base station BS allocates the corresponding resource through the CDMA-Allocation_IE of the uplink map UL-MAP using the information for discrimination of the subscriber station transmitting the bandwidth request code.

Upon receiving the resource, the subscriber station SS transmits a desired bandwidth value, i.e., a bandwidth request header BW Req Header and/or uplink data (UL Data) in step S180. According to the embodiment of the present invention, timing, power, frequency, and the like are controlled based on the ranging response message for the bandwidth request code, so the base station can transmit uplink data using modulation and channel encoding adequate using parameters indicated by the latest RNG-RSP message as a response to a bandwidth request code transmission.

According to the first embodiment of the present invention, the control of timing, power, frequency, etc. based on the channel state is performed upon reception of a bandwidth request as well as a periodic ranging request, so the data can be transmitted based on the control information according to the channel state in data transmission using a bandwidth allocated after reception of the bandwidth request code.

Namely, according to the first embodiment of the present invention, the subscriber is controlled based on the channel state at a bandwidth request as well as a periodic ranging request, reducing the periodic ranging interval T2 relative to the existing periodic ranging interval T1 of FIG. 3. Accordingly, a proper adaptive modulation and coding (AMC) level based on the wireless channel state can be applied even when the subscriber station transmits data in a mobile environment in which the channel state varies frequently, thereby achieving efficient data transmission. In addition, the data transmission timing of the individual subscriber station can be matched to prevent interference to the data of subscribers using adjacent suchannels.

Figure 8:
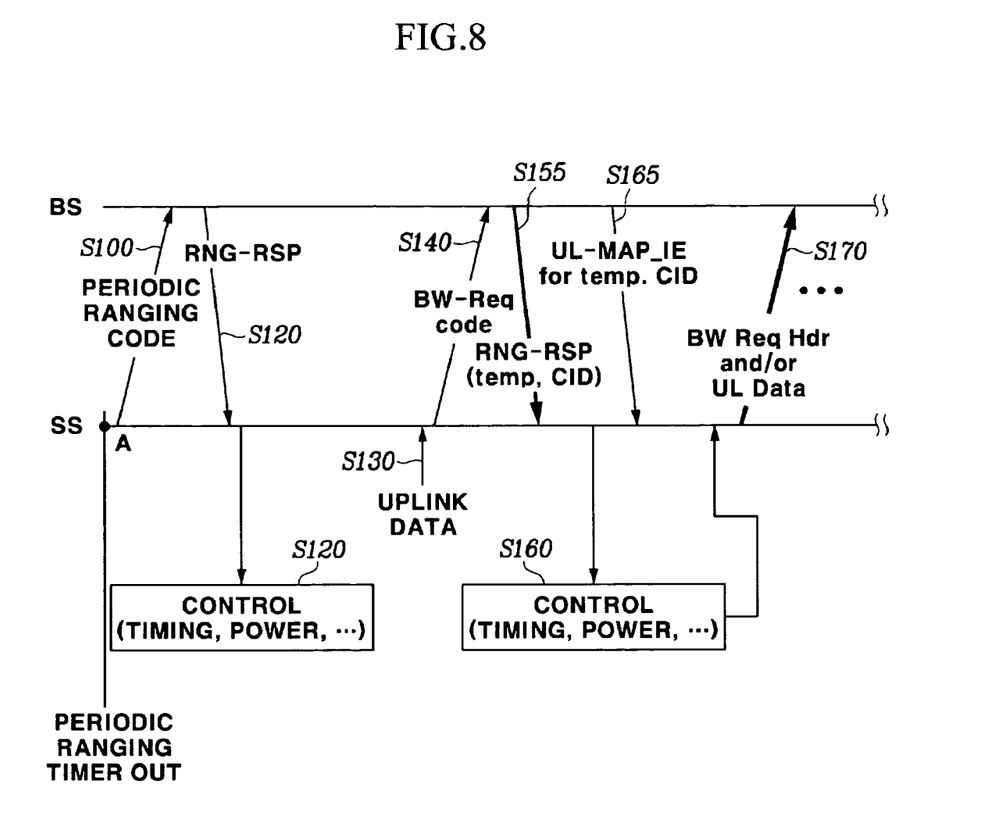
FIG. 8 shows a preamble-based bandwidth request method according to a second embodiment of the present invention.

FIG. 8 shows a preamble-based bandwidth request method according to a second embodiment of the present invention.

In FIG. 8, parts of the same or similar functions as/to the steps of FIG. 7 have the same reference numerals and will not be described below.

Referring to FIG. 8, the base station BS transmits state control information and a temporary CD to the subscriber station SS using a ranging response message in response to the bandwidth request using a preamble, in step S155. Unlike in the first embodiment of FIG. 7, the base station BS allocates an uplink resource for transmission of a bandwidth request message to the subscriber station identified by the temporary CID, in step S165. Namely, the base station BS allocates the corresponding resource through a UL_MAP_IE message using the temporary identifier.

According to the first embodiment of the present invention as shown in FIG. 7, information for discrimination of a subscriber station transmitting a code (preamble) is used as an identifier for discriminating the subscriber station during a transmission of state control information and an allocation of the uplink resource for transmission of a bandwidth request message. Contrarily, in the second embodiment of the present invention as shown in FIG. 8, a temporary CID is allocated in advance and then used to allocate an uplink resource for transmission of a bandwidth request message so as to avoid duplicated transmission of the information in a transmission of the state control information and an allocation of the resource, thereby reducing a waste of resource.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

Although the embodiment of the present invention has been described as to an IEEE 802.16e wireless portable Internet system by way of an example, it can also be applied to other wireless Internet system standards. Also, the present invention is applicable to other mobile communication systems supporting mobility in addition to the wireless portable system.

As described above, the present invention allows an efficient bandwidth request method adaptive to the channel environment in a wireless Internet system that intends to request a bandwidth using a preamble.

In addition, the present invention avoids duplicated transmission of information for discrimination of a preamble-transmitting subscriber station, reducing overhead.

The invention claimed is:

1. A method for a preamble-based bandwidth request of a base station, the method comprising:
   receiving a raging code from a subscriber station;
   transmitting a first raging response message including first state control information to the subscriber station in response to the ranging code;
   receiving a bandwidth request code from the subscriber station after transmitting the first ranging response message;
   transmitting a second ranging response message including second state control information based on a channel state to the subscriber station in response to the bandwidth request code; and
   allocating an uplink resource for transmission of a bandwidth request message to the subscriber station.

2. The method as claimed in claim 1, wherein the second ranging response message includes information for discrimination of a subscriber station which transmitted the bandwidth request code.

3. The method as claimed in claim 2, wherein the information for discrimination of the subscriber station includes at least one of a frame number, a slot number, a sub-channel number, and a code number.

4. The method as claimed in claim 3, wherein allocating the uplink resource includes allocating the uplink resource for transmission of the bandwidth request message to the subscriber station using the information for discrimination of the subscriber station.

5. The method as claimed in claim 1, wherein transmitting the second ranging response message includes allocating a temporary connection identifier to the subscriber station which transmitted the bandwidth request code, and transmitting the allocated temporary connection identifier using the second response message.

6. The method as claimed in claim 5, wherein allocating the uplink resource includes allocating the uplink resource for transmission of the bandwidth request message to the subscriber station using the temporary connection identifier.

7. The method as claimed in claim 1, wherein at least one of the first state control information and the second state control information includes timing and power offset adjustment information.

8. A method for a preamble-based bandwidth request of a subscriber station, the method comprising:
   transmitting a raging code from a base station;
   receiving a first raging response message including first state control information from the base station in response to the ranging code, and controlling the state of a subscriber station based on the first state control information;
   transmitting a bandwidth request code to the base station after receiving the first ranging response message;
   receiving a second ranging response message including second state control information from the base station in response to the bandwidth request code, and controlling the state of the subscriber station based on the second state control information;
   receiving an uplink resource allocated for transmission of a bandwidth request message from the base station; and
   performing modulation and channel coding based on second channel state information received from the base station, and transmitting uplink data using the bandwidth request message.

9. The method as claimed in claim 8, wherein receiving the second ranging response message includes receiving a temporary connection identifier allocated together with the state control information from the base station.

10. The method as claimed in claim 9, wherein receiving the uplink resource includes receiving the allocated uplink resource using the temporary connection identifier.

11. The method as claimed in claim 8, wherein receiving the second ranging response message includes controlling at least one of timing, power, and frequency as the state of the subscriber station.

12. The method as claimed in claim 8, wherein at least one of the first state control information and the second state control information includes timing and power offset adjustment information.

* * * * *